(Model.)
G. C. SHALER.
Milk Cooler.
No. 237,452. Patented Feb. 8, 1881.
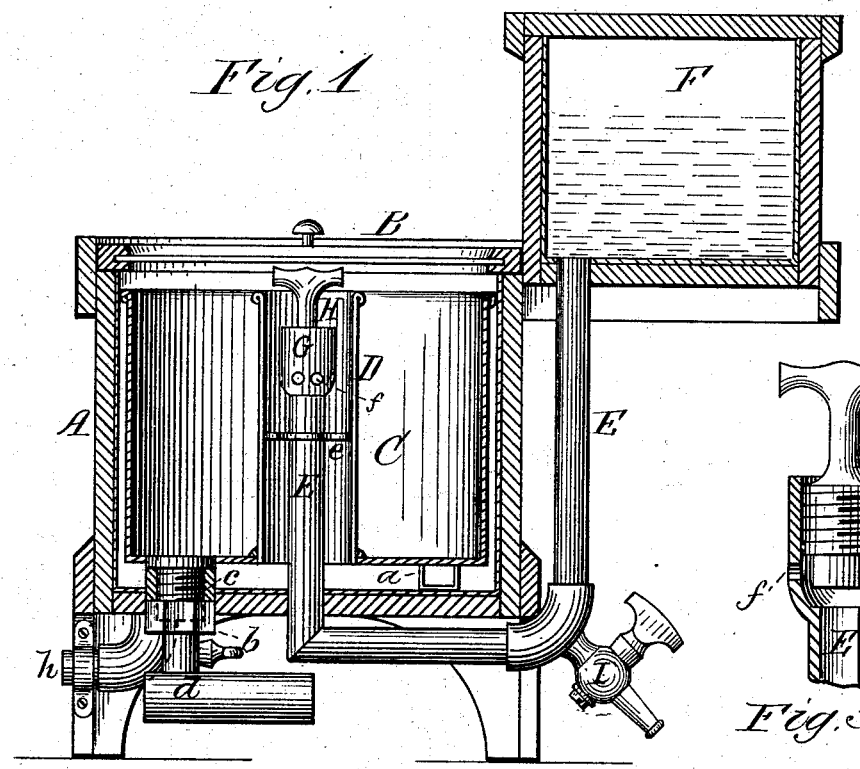
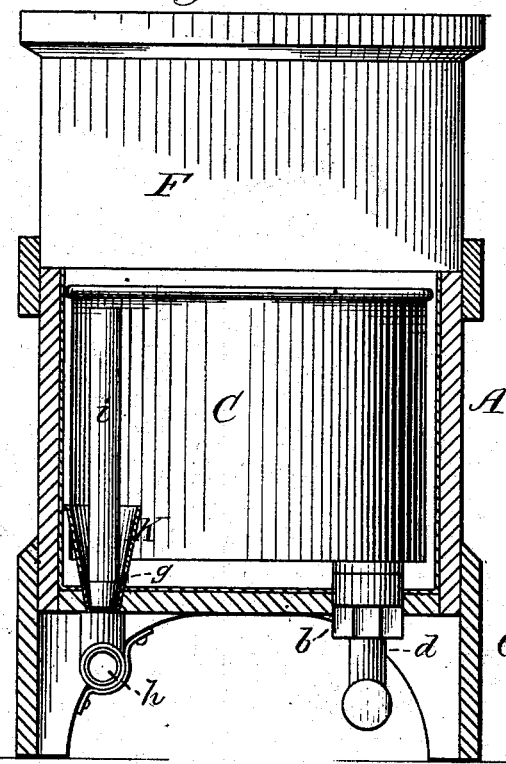
Witnesses
N. E. Oliphant,
Geo. R. Porter.
Inventor
George C. Shaler,
per Chas. H. Fowler
Att'y.

UNITED STATES PATENT OFFICE.

GEORGE C. SHALER, OF GILBOA, NEW YORK.

MILK-COOLER.

SPECIFICATION forming part of Letters Patent No. 237,452, dated February 8, 1881.

Application filed October 15, 1880. (Model.)

*To all whom it may concern:*

Be it known that I, GEORGE C. SHALER, a citizen of the United States, residing at Gilboa, in the county of Schoharie and State of New York, have invented certain new and useful Improvements in Milk-Coolers; and I do hereby declare that the following is a full, clear, and exact description of the same, reference being had to the annexed drawings, making a part of this specification, and to the letters and figures of reference marked thereon.

Figure 1 of the drawings is a sectional view of my invention, with the several pipes in elevation. Fig. 2 is an end view, showing the water-tank in section. Fig. 3 is a detail view of the upper end of the water-discharge pipe in section, with screw-plug in elevation and in a raised position, to allow the escape of water through the perforations in said pipe. Fig. 4 is a top-plan view of the central tube of the milk-vessel, the spider or brace arms with the water-discharge pipe in section.

The present invention refers to that class of milk-coolers in which the milk is reduced to the required temperature by subjecting it to a current or body of cold water which is brought in contact with the sides and center of the vessel containing the milk. In order to accomplish this the milk-vessel was constructed with a vertical central tube closed at the top, and reaching only about two-thirds the height thereof, the water-discharge pipe passing up into the tube, so that the water would be discharged in a solid stream against the closed top or end of the tube, and cool the interior sides thereof, which would, in turn, cool the milk in contact with said tube at the central portion of the vessel.

The object of this invention is to so construct the end of the water-discharge pipe that the water will be discharged in jets or small streams around and through the sides of the pipe, and against the interior sides of the open top of central tube, near the top of milk-vessel, to facilitate the process of cooling. I attain this object by the construction substantially as shown in the drawings, and hereinafter described.

In the accompanying drawings, A represents a tank of any suitable form and material; but when of wood it is preferably constructed with a metal lining. The tank A is provided with a glass cover, B, which fits tightly over the top thereof, but may be removable when desired. Within the tank A is located a vessel, C, which is somewhat less in diameter than the diameter of the tank, so as to leave a space between it and the vessel for the water to pass, the vessel having legs $a$ upon its under side, which rest upon the bottom of the tank A, to admit of space sufficient to insure a free circulation of water around the bottom and sides of the vessel C. This vessel C is removable from the tank A, but is held in position therein by a nut, $b$, engaging with the threads upon a screw-threaded tube, $c$, rigidly secured to the under side of the vessel, the screw-threaded tube passing down through a hole in the bottom of the tank A.

By means of the nut $b$ a section of pipe, $d$, is connected to the tube $c$, and may be provided with a suitable faucet for drawing off the milk in the vessel C after the milk has been reduced to the required temperature. The vessel C has a central vertical tube, D, open at both ends, and within the tube is axially located a discharge-pipe, E, which communicates with a suitable water-reservoir, F, or other desirable means of supply, the reservoir when used being elevated above the top of the tank A, in order to obtain a sufficient head of water to force it around the outer sides of the vessel C.

Secured to the pipe E, near the top thereof, is a spider, $e$, or, in other words, a series of wings projecting radially from the tube, as shown in Fig. 4, so as to form a support for both the pipe E and tube D, to retain them in their relative position, the openings of the spider being next to the inside surface of the central vertical tube, so as to allow the water to pass down uninterrupted against and along the sides thereof.

The upper end of the discharge-pipe E is of increased diameter, or enlarged, as shown at G, to form a seat, $k$, for a screw-threaded plug, H, which engages with screw-threads upon the interior of the enlargement G, the latter having small holes $f$ for the escape of the water when the screw-plug H is raised off its seat $k$, which is of annular form. This construction is simply a fountain-cock to control the flow of water in small streams or jets against the inner side of the tube D. It should be noticed that the water is discharged below the upper end of the tube, around the sides thereof, and does not pass out through the top, in which case the upper end of the tube D would have to be closed to prevent the water from passing over the end thereof and into the milk contained in the vessel C. This, however, is avoided, as the plug H prevents the water from passing out at the end of the pipe E, but causes it to find an outlet through the holes $f$ in small streams or jets in a horizontal direction against the sides of the tube D, thus making the process of cooling at the center of the vessel much more effective.

The pipe E is provided with a waste-cock, I, to clear the pipe of water, in order to prevent freezing in winter.

A funnel-shaped guide, K, is secured to the bottom of the tank A, the smaller end passing through a hole in the bottom of the tank and connecting with a pipe, $h$, for drawing off the water from the tank into a suitable receptacle placed to receive it, the guide K having perforations or small holes $g$ on a line with the bottom of the casing, so as to insure the water being thoroughly drained off when the waste or overflow pipe $i$ is removed. The pipe $i$ is slightly tapering at its lower end to snugly fit within the small end of the guide K, said pipe extending up very nearly to the rim of the vessel C, so that the water will rise around the vessel very nearly the extent of its height, but is prevented from flowing over the rim by the overflow-pipe. By making the guide K of funnel shape, when the vessel C is in place within the casing A, the overflow-pipe $i$, after being withdrawn, can be replaced without any inconvenience or trouble, the flaring edge of the guide directing the end of the pipe to its place.

The tank A, with its vessel C, tube D, funnel-shaped guide K, and overflow-pipe $i$, may be multiplied in numbers, as in practice I propose to employ a series of casings with its attachments, and in such case I shall have a corresponding number of vertical extensions to the water-discharge pipe, each of which will pass up into the central tube of its respective milk-vessel, and be provided with means for the control of the escape of water, as previously described.

The operation of cooling the milk is quite simple, and will be understood by the following description: The reservoir being first supplied with water and the vessel C filled with milk, the plug H is raised from off its seat $k$, which will allow the water in the pipe $i$ to pass out in small streams or jets, and with considerable force, through the holes $f$, against and around the interior side of the tube D, down the same, and, after filling at the bottom and exterior sides of the vessel C, is discharged through the overflow-pipe $i$, cooling the milk at the center of the vessel, as well as at the bottom and sides.

Having now fully described my invention, what I claim as new, and desire to secure by Letters Patent, is—

1. The combination, with the milk-vessel C, having the vertical central tube, D, of the water-discharge pipe E, with holes or perforations $f$, and screw-plug H at the top thereof, substantially as and for the purpose set forth.

2. The milk-vessel C, having central tube, D, in combination with the water-discharge pipe E, and the spider $e$, having its openings next the inside surface of the central tube, substantially as and for the purpose specified.

3. In a milk-cooler, the tank A, having the funnel-shaped guide K, with perforations $g$, in combination with the overflow-pipe $i$, substantially as and for the purpose described.

In testimony that I claim the above I have hereunto subscribed my name in the presence of two witnesses.

GEO. C. SHALER.

Witnesses:
LUMAN REID,
A. H. BARTLEY.